April 10, 1956    L. J. MONCRIEFF    2,740,987
PROCESS AND APPARATUS FOR MAKING HELICAL
COILS FROM THERMOPLASTIC MATERIAL
Filed March 7, 1952
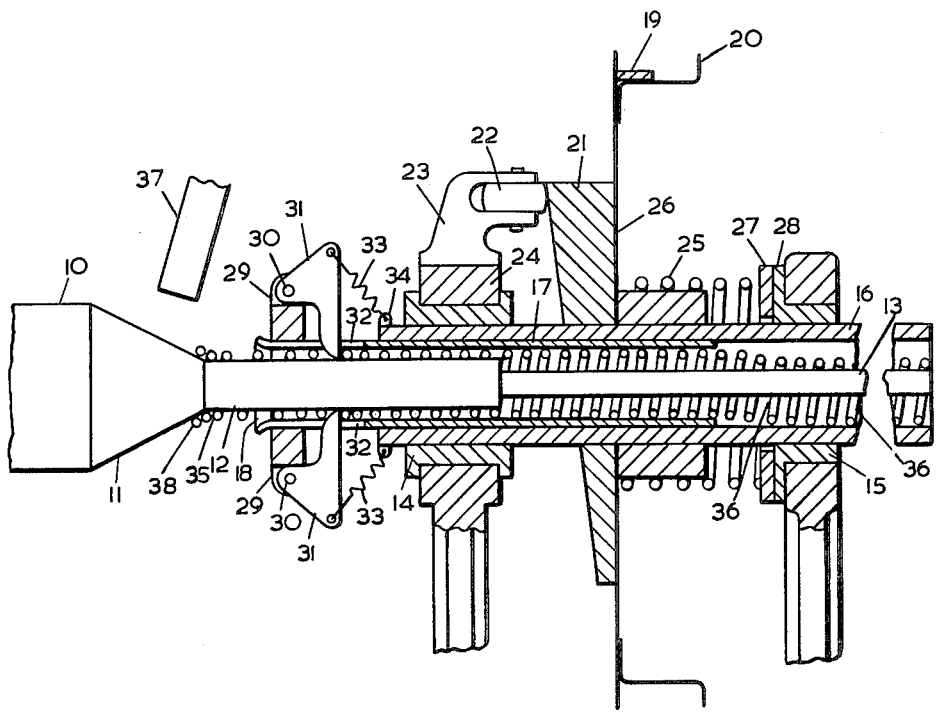
L. J. MONCRIEFF
INVENTOR
ATTORNEYS

United States Patent Office 2,740,987
Patented Apr. 10, 1956

2,740,987

PROCESS AND APPARATUS FOR MAKING HELICAL COILS FROM THERMOPLASTIC MATERIAL

Leslie John Moncrieff, London, England, assignor to British Celanese Limited, a corporation of Great Britain Application March 7, 1952, Serial No. 275,425

Claims priority, application Great Britain March 16, 1951

6 Claims. (Cl. 18—19)

This invention relates to plastics and provides a process and apparatus for making helical coils of flexible thermoplastic rod.

The process of the present invention comprises winding the thermoplastic rod in a temporarily softened condition into a helix on a winding-surface that is rotated about an axis enclosed by said surface and moving said helix parallel to said axis along and off said surface. the periphery of said surface at the winding point being greater than at any point beyond the winding point, so that at every instant the rearmost turn of the helix is of greater perimeter than any of the preceding turns and tends to slip along said surface in a direction parallel to said axis.

In its preferred form the process comprises winding the rod on to a frustro-conical winding surface and moving each turn in succession along said surface in the direction of decreasing diameter on to and along a coaxial cylindrical winding surface continuous with the frustroconical surface, the winding being effected by rotating said surfaces about their common axis, at least the greater part of said cylindrical surface being enclosed by an outer cylindrical surface of diameter slightly greater than the diameter of the cylindrical winding surface plus twice the diameter of the rod, said outer surface being coaxial with the cylindrical winding surface and being reciprocated axially and rotated in the same direction as the winding surface. The turns of rod may be moved along the cylindrical winding surface by pressure applied by a surface that moves forward in contact with a turn of the helix with each forward movement of the outer cylindrical surface and moves out of contact with the helix at each backward movement of the outer cylindrical surface.

Apparatus according to the invention comprises a mandrel rotatably mounted at one end, the cross-section of said mandrel progressively decreasing along a distance measured from a point between the ends to the free end and, after decreasing sharply along part of said distance, remaining constant along the next part, a hollow member partly enclosing said part of constant cross-section, the internal cross-section of said member being greater than, but of the same shape as the cross-section of said part, means for rotating the mandrel and the hollow member at the same angular speed in the same direction, means for reciprocating the hollow member axially during its rotation, and means actuated by the reciprocation of the hollow member for moving turns of thermoplastic rod from the part of the mandrel in which the cross-section is sharply decreasing on to and along the part over which the cross-section is constant.

Suitable means for moving the turns of rod along the mandrel comprise a plurality of fingers pivotally mounted on the outside of the hollow member and depending into the interior thereof almost into contact with the surface of the mandrel, stop means limiting the backward movement of the free ends of the fingers relative to the hollow member, and yieldable means urging said free end backwards, the arrangement being such that when mandrel and hollow member approach, the fingers swing forward out of the path of the coils of rod so allowing these coils to enter the annular space between the mandrel and the hollow member, but when mandrel and hollow member move apart, the fingers swing into the path of the coils, and move forward with the hollow member moving the coils forward with them. The action is similar to that of a ratchet driven by a reciprocating pawl. The combination of a rotating mandrel having a cylindrical part with a rotating reciprocating outer tube provided with fingers or the like for effecting axial movement along the mandrel of coils of rod wound thereon is believed to be novel in itself. When, as in the preferred form of the apparatus the mandrel tapers from a part of larger diameter to the cylindrical part that projects into the tube, the taper should be sufficiently sharp to give the turns wound on to it a tendency to slip down on to the cylindrical part of the mandrel when neighbouring turns on the cylindrical part are drawn in to the tube. Thus the taper should, for example, be from 20° to 45°. The softening of the rod can be effected by directing a stream of hot air on to the mandrel or by providing external radiant heating means or internal heating means for the mandrel.

One form of apparatus according to the invention is shown by way of example in the accompanying drawing. In the drawing (which shows the apparatus in part-sectional elevation) the mandrel 10 mounted for rotation about its longitudinal axis and provided with driving means (the bearings and driving means are not shown) has a tapered part 11 and a cylindrical part 12 which terminates in a cylindrical extension 13 of smaller diameter than the part 12. Journalled in bearings 14 and 15 is a hollow shaft 16 to the inside of which is fixed a tube 17 having a flared mouth 18. The diameter of the cylindrical part 12 is substantially equal to the internal diameter required in the helix. The internal diameter of the tube 17 is equal to the external diameter required in the helix and is greater than the diameter of the part 12 by slightly more (e. g. 20 to 50 mils more) than twice the diameter of the rod. The shaft 16 with the tube 17 is driven at the same speed as the mandrel 10 by a belt 19 engaging the broad-flanged pulley 20. At the same time the shaft 16 together with the tube 17 is given a reciprocating movement by means of the cam 21, which is fast on the shaft 16, engaging a roller 22 carried in a bracket 23 on the bearing block 24. A helical spring 25 bears against the face 26 of the pulley 20 and against a loose collar 27 on the shaft 16, this collar engaging a thrust-bearing surface 28 on the bearing 15. Fast on the tube 17 is a ring 29 having two opposite radial slots in which are mounted on pivots 30, two fingers 31 which project radially through slots 32 in the tube 17 almost into contact with the part 12 of the mandrel. Springs 33 anchored by a clip 34 on the shaft 16 resist anti-clockwise movement of the fingers 31, and the depth of the slots in the ring 29 limits clockwise movement. As the tube moves backwards (i. e. towards the mandrel) the turns of rod 35 wound on the part 12 slip past the fingers 31 moving them anti-clockwise against the action of the springs 33. The cambered rear edges of the fingers facilitate the slipping of the turns past the fingers. As the tube 17 moves forwards the springs 33 urge the fingers 31 back as far as the depth of the slots in the ring permits. In this position they prevent the turns of rod that have entered the tube from slipping back out of the tube. As a result of this action the helix 36 as it is formed is gradually urged through the tube. In the course of its passage forwards along the tube it gradually becomes cooled until it regains its resilience. The small-diameter projection 13 of the mandrel guides the helix 36 through the shaft from which it is discharged at a point not shown. The softening of the tube is effected by directing a current of hot air through the pipe 37 onto the mandrel near the point 38 on which winding commences. Cold air can be supplied to the forward end of the tube 17 to cool the helix as it moves along the winding surface 12.

In operation a few turns of the rod are wound by hand on the mandrel so that the free end of the rod is within the tube 17 and the end leading to the supply of rod leaves the tapered part of the mandrel at the point 38 (the exact position of this point is not critical). The drives of both mandrel and shaft 16 are then set in operation and the hot air supply is turned on. The rod is suitably guided to the winding point 38 and the machine then operates continuously.

Various modifications can be made in the design of the apparatus. The area of contact between the rod and the mandrel can be reduced by longitudinally grooving the surface of the mandrel. (The terms "cylindrical surface" and "conical surface" used herein are to be regarded as covering cylindrical and conical surfaces so relieved.) Instead of the two fingers 31, three or four such fingers may be symmetrically arranged round the periphery of the tube. The fingers may be replaced by star-wheels or the like arranged to rotate only in one direction. Instead of reciprocating the tube and shaft, the tube only may be reciprocated. For this purpose the tube may be made with splines engaging grooves in the shaft so as to enable the tube to be rotated by the shaft and at the same time to be free to reciprocate within the shaft. Or the mandrel may be reciprocated, the tube and shaft merely rotating. When the output required is not regarded as sufficient to justify the construction of a special machine for the purpose, a centre-lathe may readily be adapted to make the helical coils, the mandrel being held in the chuck, the slide-rest being removed, the shaft and its fittings being mounted in the tailstock bearing, the cam roller bracket being mounted on that bearing and a suitable member to take the thrust of the spring being mounted on the lathe-frame.

The following example illustrates the process of the invention:

*Example*

The thermoplastic rod used was of 60 mils diameter made from plasticised cellulose acetate by hot, solventless extrusion. The apparatus was as shown in the drawing. The cylindrical part of the mandrel was 0.375 inch in diameter. The internal diameter of the tube was 0.535 inch. The throw of the cam was 0.375 inch. The winding was started as described above, hot air was turned on to raise the temperature of the mandrel to 90–100° C. and winding was continued, the speed of the mandrel and tube being 150 revolutions per minute. In this way a helical coil of circular turns of internal diameter 0.375 inch and of pitch about 12 turns per inch was continuously produced. The helix showed considerable springiness with a recoverable extension of more than 100%.

Instead of cellulose acetate other thermoplastics can form the basis of the rod employed. Examples are: other cellulose esters of monocarboxylic acids containing 2 to 4 carbon atoms, e. g. cellulose propionate, cellulose acetate-propionate and cellulose acetate-butyrate; cellulose ethers, e. g. ethyl cellulose and benzyl cellulose; solid polymers and co-polymers of ethylene; thermoplastic polyvinyl compounds, for example polyvinyl chloride, polystyrene, and copolymers of vinyl chloride with a minor proportion of vinyl acetate, of vinylidene chloride with a minor proportion of vinyl chloride, and of vinyl chloride or vinylidene chloride with acrylonitrile or methacrylonitrile; thermoplastic polymers of acrylic acid derivatives, for example polyethyl acrylate and polymethyl methacrylate; and thermoplastic linear condensation polymers such as the nylons, polyethylene terephthalate and poly-4-amino-1.2.4-triazole.

The rod is preferably made by hot, solventless extrusion but thermoplastic rod made by other methods, for example by extruding a solution of the thermoplastic in a volatile solvent into an evaporative atmosphere or into a coagulating bath, can be used.

The cross-section of the rod is preferably circular, but rods of other cross-section for example elliptical, square, rectangular, hexagonal or octagonal can be used. The turns of the coils are preferably substantially circular but this is not essential. Thus, for example, by winding on to a surface of elliptical section coils composed of substantially elliptical turns can be made. The terms "helical coil" and "helix" are intended to cover such coils the turns of which are not substantially circular as well as coils of substantially circular turns. Several ends of the rod can be wound side by side on the mandrel so producing a multi-start helix which can be separated into individual helices each of several times the pitch that would be obtained from winding a single end under the same conditions. The softening of the thermoplastic rod is preferably effected by heat but other methods of softening are possible. The rod may for instance be softened by soaking in a volatile liquid softening agent which is evaporated at a suitable stage in the production of the helix. For cellulose acetate, mixtures of ethanol, acetone and water, e. g. in the proportions of 43:23:34 by volume produces a suitable degree of softening without stickiness.

Helical coils made by the process of the invention may be used, for instance, in book binding, the pages and book covers suitably perforated being threaded on a section of the helix. Another use for coils made by the process of the invention is as an outer cover for a number of flexible insulated electric wires to prevent snarling when an instrument, e. g. a telephone instrument to which the wires are connected, is moved. The coils of the invention may also be used in making toys and for decorative purposes.

Having described my invention, what I desire to secure by Letters Patent is:

1. Process for making helical coils of thermoplastic rod, which comprises winding a thermoplastic rod in a temporarily softened condition into a helix on a frustro-conical winding surface, and causing each turn in succession to slip along said surface, in the direction of decreasing diameter, on to and along a coaxially cylindrical winding surface continuous with the frusto-conical surface, the winding being effected by rotating said surfaces about their common axis, at least the greater part of said cylindrical surface being enclosed by an outer cylindrical surface of diameter slightly greater than the diameter of the cylindrical winding surface plus twice the diameter of the rod, the movement of the helix along the cylindrical winding surface carrying it through the annular space between said winding surface and the outer cylindrical surface, said outer surface being coaxial with the cylindrical winding surface, being reciprocated axially and rotated in the same direction as the winding surface, and serving to limit transverse expansion of the helix, and the slipping of the turns along the winding surface being caused by pressure applied by a surface that moves forward in contact with a turn of the helix with each forward movement of the outer cylindrical surface, and moves out of contact with the helix at each movement of said outer surface.

2. Process for making helical coils of thermoplastic rod, which comprises winding a cylindrical rod of plasticized cellulose acetate in a heat-softened condition into a helix on a frustro-conical winding surface and causing each turn in succession to slip along said surface in the direction of decreasing diameter on to and along a coaxial cylindrical winding surface continuous with the frusto-conical surface, the winding being effected by rotating said surfaces about their common axis, at least the greater part of said cylindrical surface being enclosed by an outer cylindrical surface of diameter slightly greater than the diameter of the cylindrical winding surface plus twice the diameter of the rod, the movement of the helix along a cylindrical winding surface carrying it through the annular space between said winding surface and the outer cylindrical surface, said outer surface being coaxial with the cylindrical winding surface, being reciprocated axially and rotated in the same direction as the winding surface and serving to limit the transverse expansion of the helix, and the slipping of the turns along the winding surface being caused by pressure applied by a surface that moves forward in contact with a turn of the helix with each forward movement of the outer cylindrical surface and moves out of contact with the helix at each backward movement of said surface.

3. Process according to claim 2, which comprises making a multi-start helix by winding a plurality of rods side by side.

4. Apparatus for making helical coils of thermoplastic rod, which comprises a mandrel rotatably mounted at one end and having in the axial direction away from said end a sharply tapering portion followed immediately by a part of constant cross-sectional area and a second part of constant cross-sectional area which is less than the cross-sectional area of said part, a hollow member partly enclosing said part of constant cross-section and providing the outer wall of an annular space for the passage of the helix, said wall serving to limit transverse expansion of the helix, the inner wall of said space being the outer surface of said part of constant cross-section, the internal cross-section of said hollow member being of the same shape as the cross-section of said part, means for rotating the mandrel and the hollow member at the same annular speed in the same direction, means for reciprocating the hollow member axially during its rotation, and means actuated by the reciprocation of the hollow member for moving turns of thermoplastic rod from the part of the mandrel in which the cross-section is sharply decreasing on to and along the part over which the cross-section is constant, and through said annular space.

5. Apparatus for making helical coils of thermoplastic rod, which comprises a mandrel rotatably mounted at one end, said mandrel comprising a frustro-conical part and, extending from the narrow end of the frustrum, a coaxial cylindrical part, a hollow cylindrical member coaxial with and partly enclosing said cylindrical part of the mandrel and providing the outer wall of an annular space for the passage of the helix, said wall serving to limit transverse expansion of the helix, the inner wall of said space being the outer surface of said cylindrical part, means for rotating the mandrel and the hollow member at the same annular speed in the same direction, means for reciprocating the hollow member axially during this rotation and means actuated by the reciprocation of the hollow member for moving turns of thermoplastic rod from the frustro-conical part of the mandrel on to and along the cylindrical part and through said annular space.

6. Apparatus for making helical coils of thermoplastic rod, which comprises a mandrel rotatably mounted at one end, said mandrel comprising a frustro-conical part and, extending from the narrow end of the frustrum, a coaxial cylindrical part, a hollow cylindrical member coaxial with and partly enclosing said cylindrical part of the mandrel and providing the outer wall of an annular space for the passage of the helix, said wall serving to limit transverse expansion of the helix, the inner wall of said space being the outer surface of said cylindrical part, means for rotating the mandrel and the hollow member at the same annular speed in the same direction, means for reciprocating the hollow member axially during this rotation and means actuated by the reciprocation of the hollow member for moving turns of thermoplastic rod from the frustro-conical part of the mandrel on to and along the cylindrical part and through said annular space, the means for moving the turns of rod along the mandrel comprising: a plurality of fingers pivotally mounted on the outside of the hollow member and depending into the interior thereof, almost into contact with the surface of the mandrel, stop means limiting the backward movement of the free ends of the fingers relative to the hollow member, and yieldable means urging said free ends backwards, the arrangement being such that, when mandrel and hollow member approach, the fingers swing forward out of the path of the coils of rod, so allowing these coils to enter the annular space between the mandrel and the hollow member, but, when mandrel and hollow member move apart, the fingers swing into the path of the coils and move forward with the hollow member, moving the coils forward with them.

References Cited in the file of this patent

UNITED STATES PATENTS

| | | |
|---|---|---|
| 1,946,870 | Moon | Feb. 13, 1934 |
| 2,393,058 | Pierce et al. | Jan. 15, 1946 |
| 2,467,227 | Potter et al. | Apr. 12, 1949 |
| 2,545,271 | Gartner | Mar. 13, 1951 |